United States Patent [19]

Lunde

[11] 4,175,403
[45] Nov. 27, 1979

[54] HEAT RECOVERY SYSTEM

[76] Inventor: Jon Lunde, 1227 Greyrock Crescent, Ottawa, Ontario, Canada, K2C 2A6

[21] Appl. No.: 804,056

[22] Filed: Jun. 6, 1977

[30] Foreign Application Priority Data

Jun. 7, 1976 [CA] Canada ..................... 254216

[51] Int. Cl.² ............... F25B 13/00; F28D 5/00; F25D 17/06
[52] U.S. Cl. .................... 62/324; 62/428; 62/305
[58] Field of Search ........... 62/324 R, 418, 79, 95, 62/113, 305, 513, 96, 406, 428

[56] References Cited

U.S. PATENT DOCUMENTS

| | | | |
|---|---|---|---|
| 2,333,309 | 11/1943 | Gould | 62/95 |
| 2,522,484 | 9/1950 | Ringquist et al. | 62/113 |
| 2,698,524 | 1/1955 | Rygard | 62/428 |
| 2,892,324 | 6/1959 | Quick | 62/238 R |
| 3,151,469 | 10/1964 | Quick | 62/113 |
| 3,640,090 | 2/1972 | Arej | 62/513 |
| 3,867,979 | 2/1975 | Carrasse et al. | 62/79 |
| 4,024,728 | 5/1977 | Gustafsson | 62/324 |
| 4,055,964 | 11/1977 | Swenson et al. | 62/324 |

*Primary Examiner*—Lloyd L. King

[57] ABSTRACT

The air-to-air split system or packaged heat pump system is used to heat and cool buildings. In the heating mode it extracts heat from the outside air for space heating. Heating and cooling with this type of heat pump is achieved by reversing the flow of refrigerant through the outdoor and indoor refrigerant coils. In the heating mode the outdoor coil acts as an evaporator and extracts heat from the air, the indoor coil acts as a condensor and gives off heat to the air handling system for the building. The reverse action takes place in the cooling mode. The operation of the reversing valve is controlled by a heating and cooling thermostat inside the building.

This invention relates to the use of the described heat pump system in the heating mode in combination with the exhaust system for the building to extract heat from the building exhaust air, which is normally exhausted to the outside air without any heat removal. The heat recovered from the exhaust air is thus used to heat the building with a saving in energy.

The essential part of this invention is the air diffuser with adjustable louvre, which is mounted on the exhaust fan and ties the two conventional systems together to form a heat recovery system for exhaust air.

6 Claims, 5 Drawing Figures

HEAT RECOVERY SYSTEM

BACKGROUND OF THE INVENTION

A conventional air-to-air split system or packaged heat pump system is used to heat and cool buildings. Heating and cooling with this type of heat pump system is achieved by reversing the flow of refrigerant through the outdoor and indoor coils. In the heating mode it extracts heat from the outside air for space heating the interior of the building. In the heating mode the outdoor coil acts as a condensor and gives off heat to the air handling system for heating the building. The reverse action takes place in the cooling mode. The operation of the reversing valve is controlled by a heating and cooling thermostat inside the building. In conventional systems, a percentage of the air from the building is exhausted to the atmosphere. No attempt is made to recover heat from this exhaust air.

BRIEF DESCRIPTION OF THE INVENTION

This invention relates to the use of the described conventional heat pump system in the heating mode in combination with the exhaust system for the building to extract heat from the building exhaust air, which is normally exhausted to the outside air without any heat removal. The heat recovered from the exhaust air is thus used to heat the building with a saving in energy.

The invention is directed to an improvement in the performance of an air-to-air heat pump system of a building, operating in the heating mode, the improvement comprising combining the said system with an indoor exhaust air system having an indoor exhaust air moving means connected to an outdoor air diffuser, the outdoor heat exchange coil being traversed by a flow of outdoor air forced by air moving means associated with the outdoor heat exchange coil, said diffuser being located adjacent said outdoor heat exchange coil so that the exhaust air from the diffuser is passed in association with outdoor air through the outdoor heat exchange coil to recover heat from the exhaust air for reuse in the air conditioning system, thereby reducing the overall energy requirement of the air conditioning system in the heating mode.

In the heat recovery system described the exhaust air moving means can be located outdoors and combined with the outdoor diffuser into a single package or unit. The outdoor diffuser and the outdoor heat exchange coil can be spaced 1 to 2 ft. apart without being limited to said spacing.

In the heat recovery system described, the outdoor heat exchanger, diffuser and exhaust air moving means can be combined into a single package or unit.

The heat recovery system can include a support on which is mounted the outdoor heat exchanger and the exhaust air moving means with the air diffuser connected to the exhaust air moving means. The system can also include a screen attached between the diffuser and the outdoor heat exchanger to prevent entry of leaves or other foreign matter into the system.

The essential part of this invention is the air diffuser with adjustable louvre, which is mounted on the exhaust fan and ties the two conventional systems together to form a heat recovery system for exhaust air.

DRAWINGS

The relationship between the outdoor section of the heat pump and the exhaust system is shown in the accompanying drawings, wherein.

For more detailed disclosure of the invention, reference is made to the drawings:

DETAILED DESCRIPTION OF AN EMBODIMENT OF THE INVENTION

Figure 1:
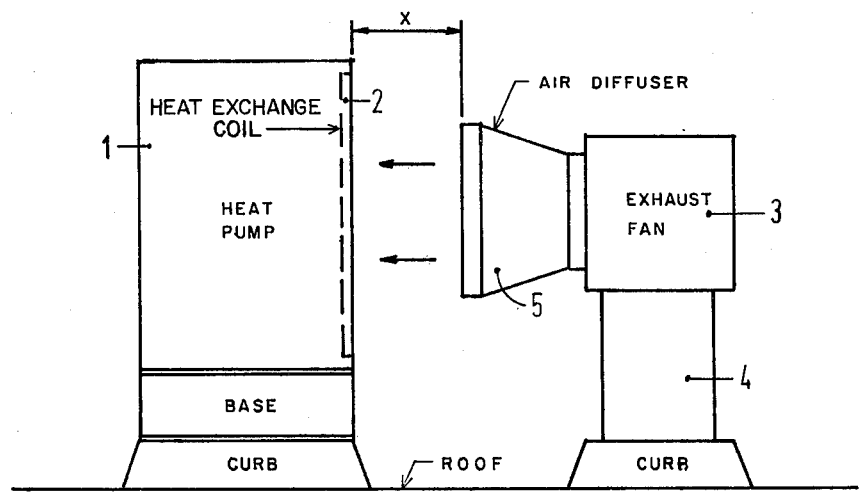
FIG. 1 is an elevation of the heat recovery system, comprising the outdoor section of an air-to-air heat pump, exhaust air diffuser and exhaust fan.
Figure 2:
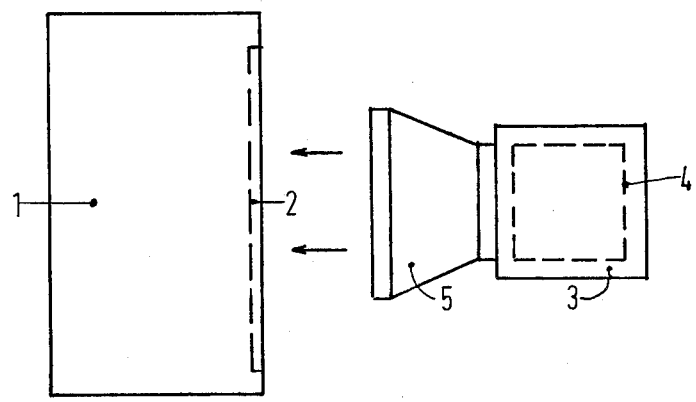
FIG. 2 is a plan view of the heat recovery system shown in FIG. 1.

In FIG. 1, 1 is the outdoor section of the split system air-to-air heat pump and 2 the heat exchange coil. The exhaust fan 3 is connected by duct 4 to the building exhaust system. The air diffuser 5 with adjustable louvre, is fastened to the exhaust fan 3. The air diffuser 5 directs and distributes the exhaust air evenly over the entire surface of the heat exchange coil 2. Distance X is determined by the quantity of the exhaust air being discharged by the exhaust fan 3 and the air velocity, and can vary between say 1 and 2 ft., without being limited to said spacing. The exhaust fan 3 can also be located inside the building as shown in FIG. 5.

Figure 3:
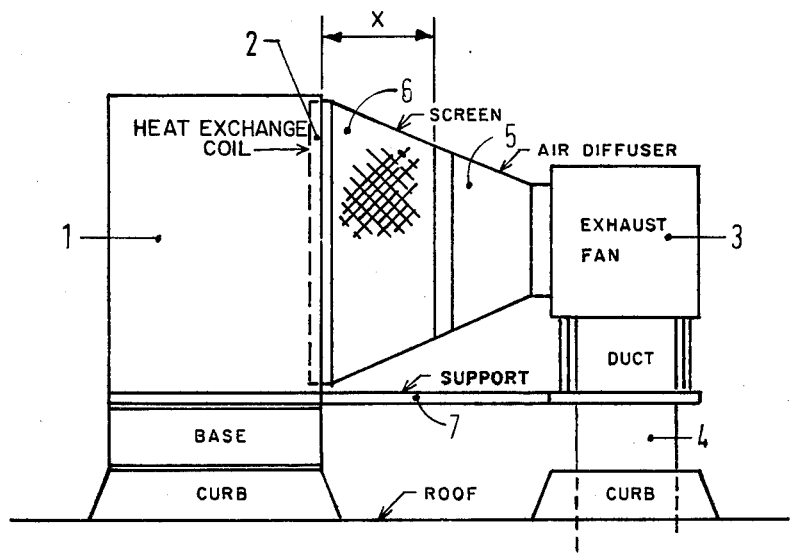
FIG. 3 is an elevation of the heat recovery system, comprising the outdoor section of an air-to-air heat pump, exhaust air diffuser and exhaust fan forming an integral unit.
Figure 4:
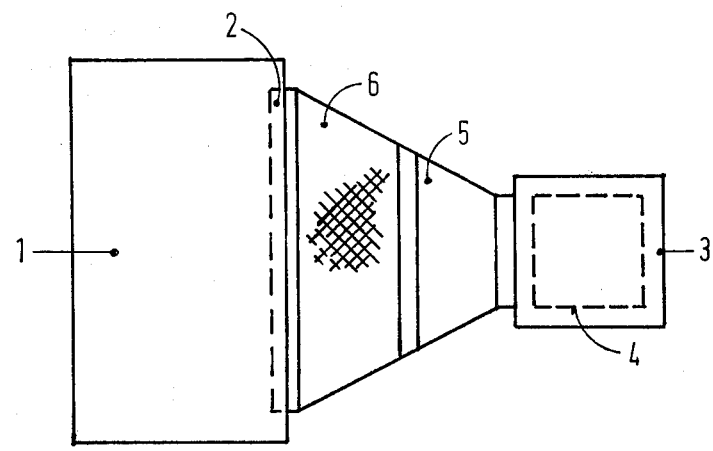
FIG. 4 is a plan view of the heat recovery system shown in FIG. 3.

In FIG. 3, 1 is the outdoor section of the split system air-to-air heat pump and 2 the heat exchange coil. The exhaust fan 3 is connected by duct 4 to the building exhaust system. The air diffuser 5 with adjustable louvre, is fastened to the exhaust fan 3. The air diffuser 5 directs and distributes the exhaust air evenly over the entire surface of the heat exchange coil 2. The screen 6 is removable for inspection and cleaning of the heat exchange coil 2. A supporting frame 7 is fastened to the outdoor section 1 of the split system air-to-air heat pump to support the exhaust fan 3 and the air diffuser 5, to form a package heat recovery system. Distance X is determined by the quantity of the exhaust air being discharged by the exhaust fan 3 and the air velocity, and can vary between say 1 and 2 ft., without being limited to said spacing.

Figure 5:
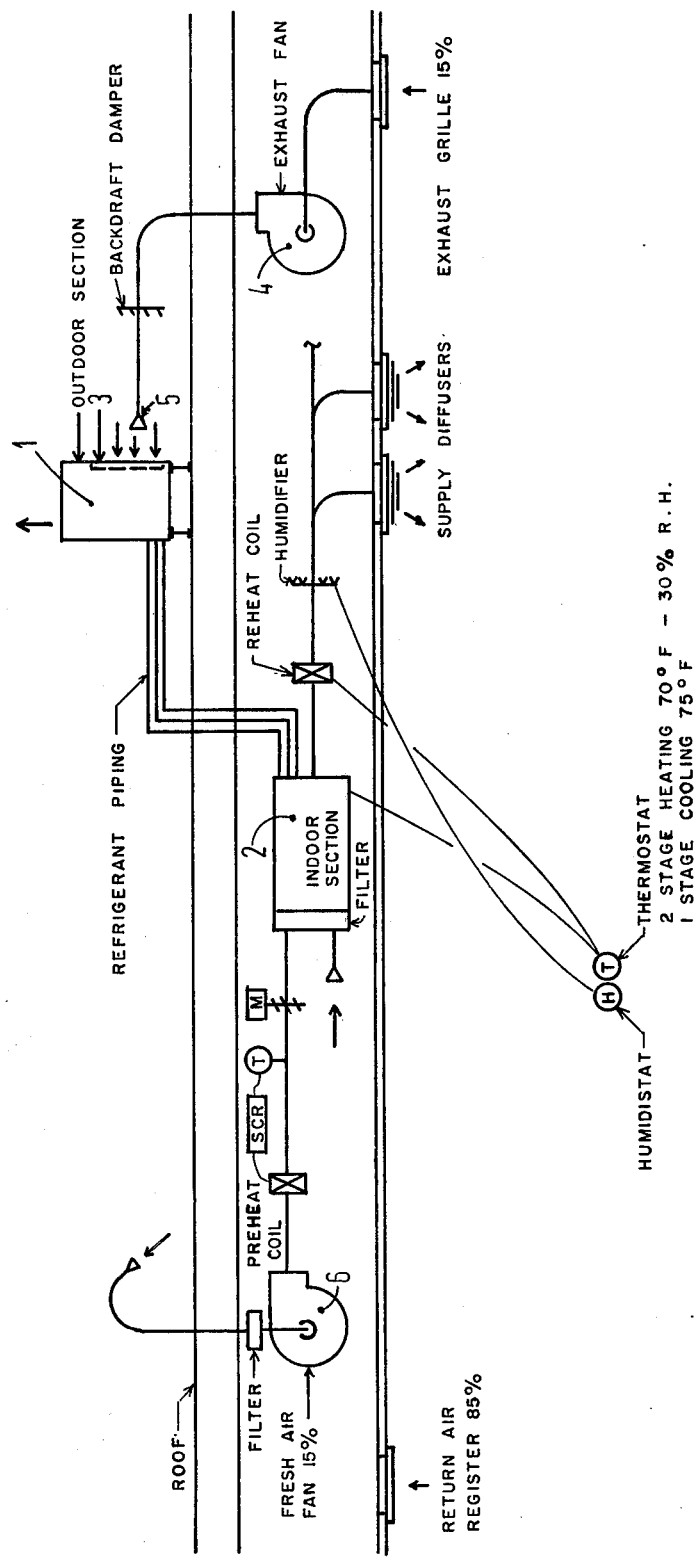
FIG. 5 is a schematic drawing showing the various components of an air conditioning system for a space in a building, using an air-to-air heat pump and accessories with provision to recover the heat from the exhaust air by blowing the exhaust air evenly over the coil surface of the outdoor section of the heat pump, which in this case is shown to be located on the roof of the building.

In FIG. 5, which illustrates how my invention can be incorporated into a conventional system, the outdoor section of the split system air-to-air heat pump is represented by 1 and the indoor section by 2. 3 is the heat exchange coil of the outdoor section 1, 4 is the exhaust fan and 5 is the air diffuser with adjustable louvre, fastened to the exhaust duct. 6 is the fresh air supply fan.

I claim:

1. A heat recovery system for an air conditioning system of a building, operating in the heating mode, including an outdoor heat exchanger and an indoor heat exchanger interconnected by refrigerant piping, the improvement comprising combining with said system an indoor exhaust air system having an indoor exhaust air moving means connected to an outdoor air diffuser, the outdoor heat exchanger being traversed by a flow of outdoor air forced by air moving means associated with the outdoor heat exchanger, said diffuser being located adjacent said outdoor heat exchanger so that the exhaust air from the diffuser is passed through and mixed with outdoor air before passing through the outdoor heat exchanger to recover heat from the exhaust air for reuse in the air conditioning system, thereby reducing the overall energy requirement of the air conditioning system in the heating mode.

2. A heat recovery system as in claim 1 wherein the exhaust air moving means is located outdoor and combined with the outdoor diffuser into a single package or unit.

3. A heat recovery system as in claim 1 wherein the outdoor diffuser and the outdoor heat exchanger is spaced 1 to 2 ft. apart.

4. A heat recovery system as in claim 1 wherein the outdoor heat exchanger, diffuser and exhaust air moving means are combined into a single package or unit.

5. A heat recovery system as in claim 1 including a support on which is mounted the outdoor heat exchanger and the exhaust air moving means with the air diffuser connected to the exhaust air moving means.

6. A heat recovery system as in claim 1 including a screen attached between the diffuser and outdoor heat exchanger to prevent entry of leaves or other foreign matter.

* * * * *